(12) United States Patent
Christens-Barry

(10) Patent No.: US 11,758,417 B2
(45) Date of Patent: Sep. 12, 2023

(54) METHODS AND SYSTEMS FOR PROVIDING AUTONOMOUS WIRELESS COVERAGE

(71) Applicant: DISH Wireless L.L.C., Englewood, CO (US)

(72) Inventor: Owen Christens-Barry, Castle Rock, CO (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

(21) Appl. No.: 17/501,948

(22) Filed: Oct. 14, 2021

(65) Prior Publication Data
US 2023/0121569 A1    Apr. 20, 2023

(51) Int. Cl.
*H04W 24/02*    (2009.01)
*H04W 4/021*    (2018.01)
(Continued)

(52) U.S. Cl.
CPC .......... *H04W 24/02* (2013.01); *H04W 4/021* (2013.01); *H04W 16/18* (2013.01); *H04W 84/005* (2013.01); *H04W 88/08* (2013.01)

(58) Field of Classification Search
CPC ..... H04W 24/02; H04W 16/26; H04W 24/08; H04W 24/10; H04W 64/003; H04W 16/00; H04W 16/18; H04W 24/04; H04W 28/0289; H04W 4/021; H04W 4/024; H04W 4/029; H04W 4/80; H04W 64/00; H04W 72/048; H04W 84/06; H04W 84/18; H04W 16/20; H04W 16/32; H04W 4/02; H04W 4/30; H04W 4/40; H04W 48/20; H04W 84/005; H04W 84/047;
(Continued)

(56) References Cited

U.S. PATENT DOCUMENTS 10,321,330 B2 *    6/2019    Zerick ................... H04W 24/04
2012/0088498 A1 *    4/2012    Xiao ..................... H04W 24/02
                                                                    455/424
(Continued)

FOREIGN PATENT DOCUMENTS

CN    206893788 U    *    1/2018
CN    216216890 U    *    4/2022
(Continued)

*Primary Examiner* — Matthew C Sams
(74) *Attorney, Agent, or Firm* — Perkins Coie LLP

(57) ABSTRACT

A technique is directed to methods and systems for providing autonomous wireless coverage. In some implementations, the autonomous wireless coverage providing machine (e.g., a mobile wireless tower) can move to various locations to optimize coverage, connectivity, and/or quality. The mobile wireless tower can collect environment data of a location and determine the terrain and wireless devices requesting coverage. The mobile wireless tower can identify a location to provide network coverage to the devices based on the terrain. In some implementations, the mobile wireless tower can determine a location to provide coverage using Artificial Intelligence or Machine Learning retrieved from the network for which the mobile wireless tower provides coverage. The mobile wireless tower can have a flexible length wired or wireless backhaul capability for the mobile wireless tower to send data and retrieve data stored on the network.

20 Claims, 6 Drawing Sheets

(51) Int. Cl.
*H04W 16/18* (2009.01)
*H04W 84/00* (2009.01)
*H04W 88/08* (2009.01)

(58) Field of Classification Search
CPC ............... H04W 88/08; H04B 7/18504; H04B 7/18506; H04B 7/18502; H04B 7/2606; B64C 2201/122; B64C 39/024; G06N 3/0445; G06N 3/0454; G06N 3/08; G06N 3/084
See application file for complete search history.

(56) References Cited

U.S. PATENT DOCUMENTS

| | | | |
|---|---|---|---|
| 2013/0163565 A1* | 6/2013 | Lee | H04W 36/32 370/332 |
| 2015/0312774 A1* | 10/2015 | Lau | G05D 1/102 455/446 |
| 2016/0021503 A1* | 1/2016 | Tapia | H04W 24/02 455/456.1 |
| 2017/0013476 A1* | 1/2017 | Suthar | H04W 4/30 |
| 2017/0019799 A1* | 1/2017 | Djordjevic | H04W 16/26 |
| 2017/0111228 A1* | 4/2017 | Obaidi | H04W 24/02 |
| 2018/0199210 A1* | 7/2018 | Zerick | H04W 24/04 |
| 2019/0014488 A1* | 1/2019 | Tan | H04W 24/02 |
| 2019/0222297 A1* | 7/2019 | Vos | H04B 7/18506 |
| 2020/0112882 A1* | 4/2020 | Mustajärvi | G05D 1/0022 |
| 2021/0384962 A1* | 12/2021 | Boyali | G08G 5/0013 |

FOREIGN PATENT DOCUMENTS

| | | | | |
|---|---|---|---|---|
| EP | 2938117 A1 | * | 10/2015 | ............ H04W 24/02 |
| WO | WO-2005081012 A1 | * | 9/2005 | ............ G01S 5/0284 |
| WO | WO-2017066647 A1 | * | 4/2017 | ............. B60L 53/12 |

* cited by examiner

METHODS AND SYSTEMS FOR PROVIDING AUTONOMOUS WIRELESS COVERAGE

BACKGROUND

Users receive wireless coverage for their devices from static wireless coverage providing towers. As a user moves away from a static wireless tower, the signal quality or coverage can decrease or fail. In some cases, the coverage quality can decrease based on the volume of devices requesting coverage from the static wireless tower.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for providing autonomous wireless coverage. Wireless towers provide coverage to a variety of devices, however due to the wireless towers being static, the wireless towers are unable to change locations to provide coverage based on the location of the devices. Thus, there is a need for an autonomous mobile wireless tower that can change locations to provide coverage to users.

The autonomous wireless coverage providing machine (e.g., a mobile wireless tower on wheels/treads) can move to various locations to optimize coverage, connectivity, and/or quality. In some implementations, the mobile wireless tower can collect environment data (e.g., scan the terrain, detect devices, etc.) of a location and determine the terrain and wireless devices requesting coverage. The mobile wireless tower can identify a location to provide the optimal coverage to the devices based on the terrain and location of the devices. For example, during a sporting event there is a group of devices in a stadium arena requesting coverage, the mobile tower can determine a location near the stadium (e.g., in the parking lot) to provide coverage. In some implementations, the mobile wireless tower can determine a location to provide coverage using Artificial Intelligence (AI) or machine learning (ML) retrieved from the network for which the mobile wireless tower provides coverage. The mobile wireless tower can have a flexible-length wired and/or remote/wireless backhaul capability (i.e. satellite, fixed wireless access, Wi-Fi, cellular, etc.) for the mobile wireless tower to send and retrieve data stored on the network.

Figure 1:
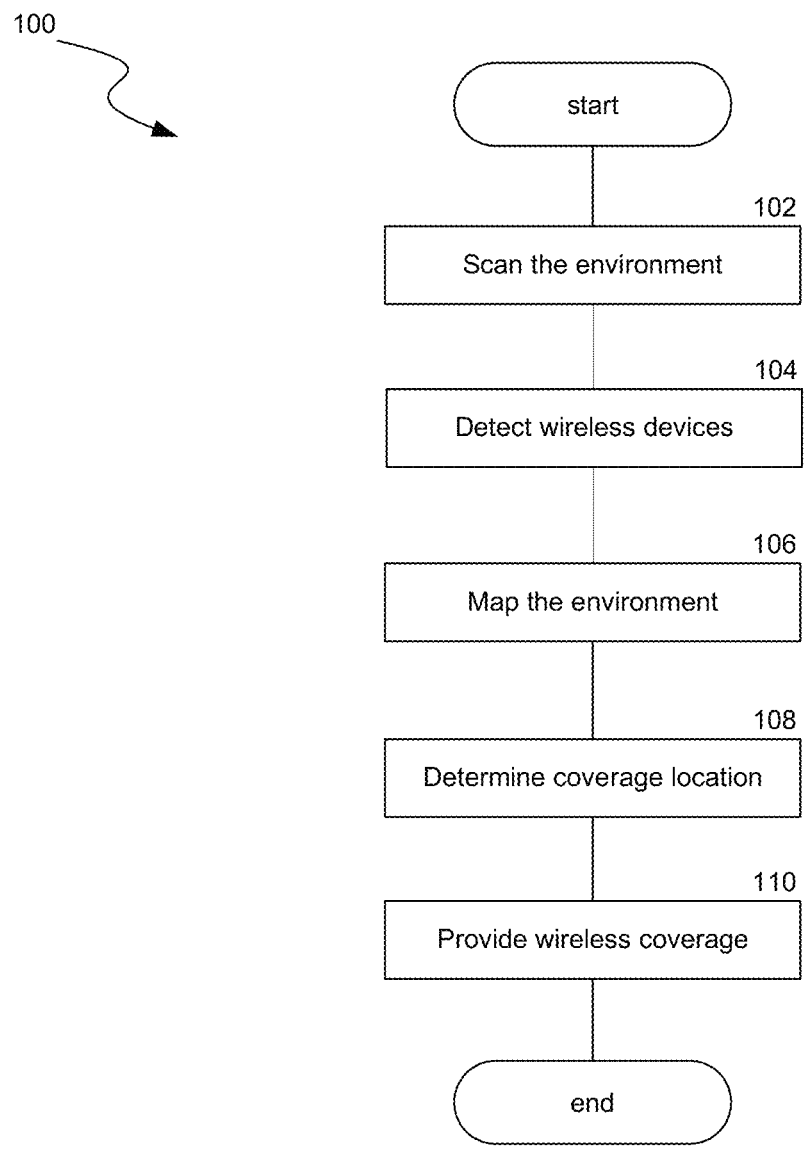
FIG. 1 is a flow diagram illustrating a process used in some implementations for providing autonomous wireless coverage.
Figure 3:
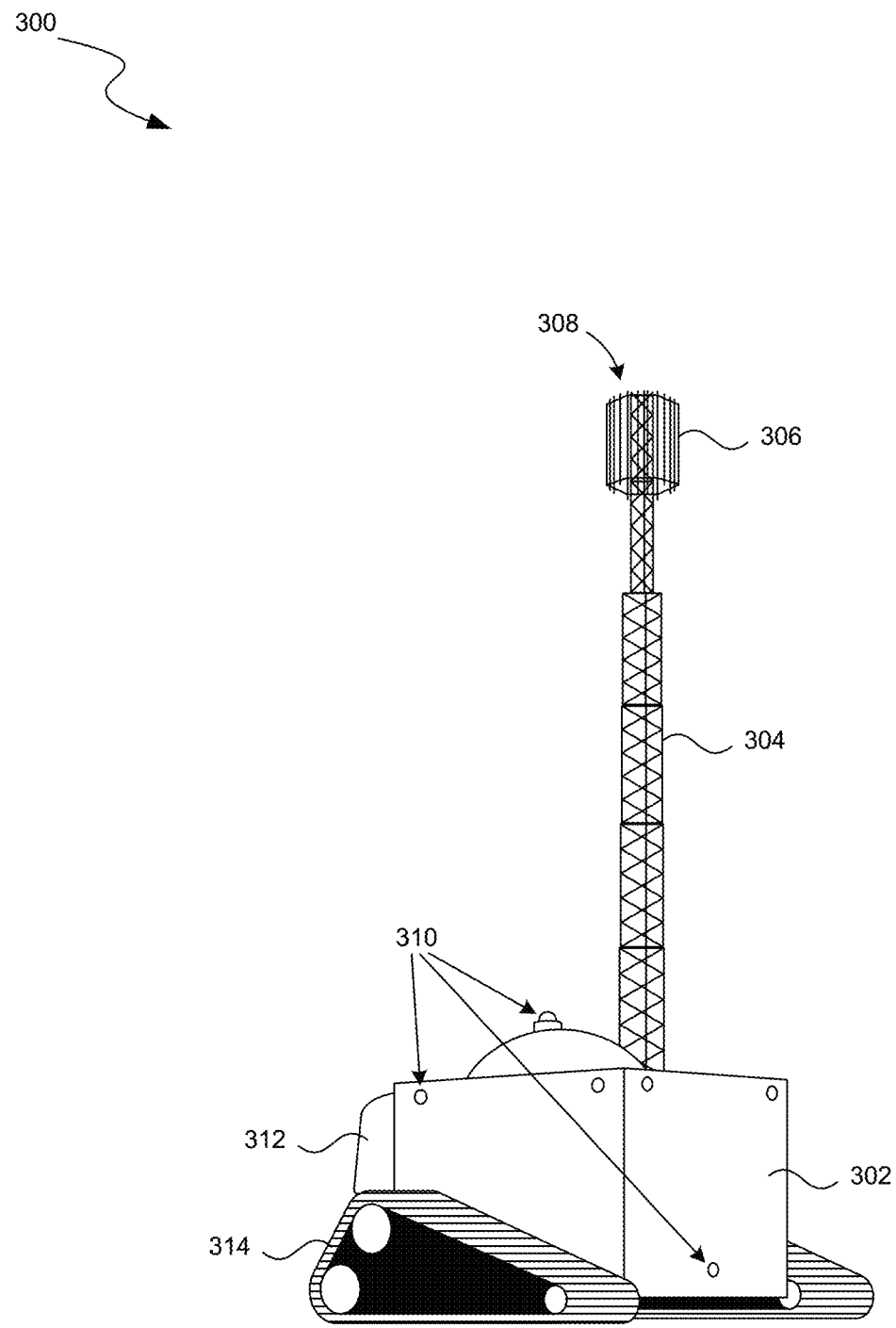
FIG. 3 is an illustration of autonomous wireless tower.

Several implementations are discussed below in more detail in reference to the figures. FIG. 1 is a flow diagram illustrating a process 100 used in some implementations for providing autonomous wireless coverage. In an embodiment, process 100 is triggered by a mobile wireless tower powering on, a mobile wireless tower connecting to or communicating with a network, a mobile wireless tower changing locations, a user request for wireless coverage, or network coverage dropping below a threshold value in an area. Example 300 of FIG. 3 illustrates a mobile wireless tower 302 (e.g., an autonomous wireless coverage providing machine). The mobile wireless tower 302 can include a telescoping tower 304, cellular antennas/radios 306, fixed wireless backhaul radios 308, sensors 310 (e.g., cameras, LIDAR, etc.), a power source 312 (e.g., battery, engine, etc.) and wheels or treads 314.

At step 102, process 100 scans an environment to identify the terrain (e.g., buildings, mountains, trees, objects, hills, etc.) of an area. Process 100 can scan the environment using sensors, such as LIDAR or cameras, or any environment detection device to collect environment data. In some implementations, process 100 monitors network utilization and scans an environment to detect locations where network coverage to users is lacking or below a coverage quality threshold. Process 100 can map an environment based on user (e.g., engineer, technician, etc.) collected data, data collected from the mobile wireless tower, or data from the network (e.g., private or macro network) that the mobile wireless tower is a part of. The whole "network brain" (intelligence center) is in the cloud and/or on the local devices or wireless towers. Process 100 can predict network optimizations from historical performance data based on an AI-based experiential/prediction ability, such that process 100 identifies the various combinations of network/device/environmental factors. For example, when the weather changes from sunny to rainy at an event stadium, the mobile wireless tower can shift locations (e.g., to lower telescoping elevation of the radios 306 on the telescoping tower 304) to mitigate interference from the environmental conditions such as moisture or wind.

At step 104, process 100 detects wireless devices (e.g., handheld or laptop devices, cellular telephones, wearable electronics, gaming consoles, tablet devices, drones, vehicles, equipment, etc.) of users in an area connected to the network. For example, process 100 detects devices using the network protocols, sim cards, or network authorization. At step 106, process 100 generates a mapping of the environment with the devices in the area. The mapping can include locations of the wireless devices and locations from which the mobile wireless tower can provide coverage. Process 100 can generate a map of a private network or a virtual/sliced private network within a broader macro network. In some implementations, process 100 can map the environment before and/or during the operation of a mobile wireless tower. In some implementations, process 100 generates the mapping using the network design data and the environment data collected by the devices (e.g., cameras, lidar, microphones, etc.). Process 100 can determine the network design based on the current location and coverage of the wireless towers in the network. In some implementations, process 100 uses ML or AI to generate the environment mapping.

At step 108, process 100 determines a location from which to provide coverage to the wireless devices. In some implementations, process 100 performs testing at various locations to collect signal quality measurements and determine the optimal location to provide coverage to the wireless devices. Process 100 can define rule sets to govern the locations and movements of the mobile wireless tower. The rule sets can originate as human-defined decisions/locations based on situations. In an example, when the mobile wireless tower detects an object, such as a tree, obstructing the line of sight to a wireless device, a predefined command instructs the mobile wireless tower to move until the object is not obstructing the line of sight to the wireless device. In another example, when the mobile wireless tower detects a vehicle approaching the location of the mobile wireless tower, the mobile wireless tower can move out of the path of the vehicle. In some implementations, the mobile wireless tower can communicate with other autonomous vehicles at a location to avoid collisions and determine coverage locations. Operation rule sets can start as manual, human-defined rule sets and progress to AI-defined rule sets, as the network collects environment data and user data. In some implementations, the mobile wireless tower can determine the location from which to provide coverage using AI or ML retrieved from the network. Additional details on ML are provided in FIG. 6. At step 110, process 100 provides wireless coverage from the selected location to the wireless devices.

Figure 2:
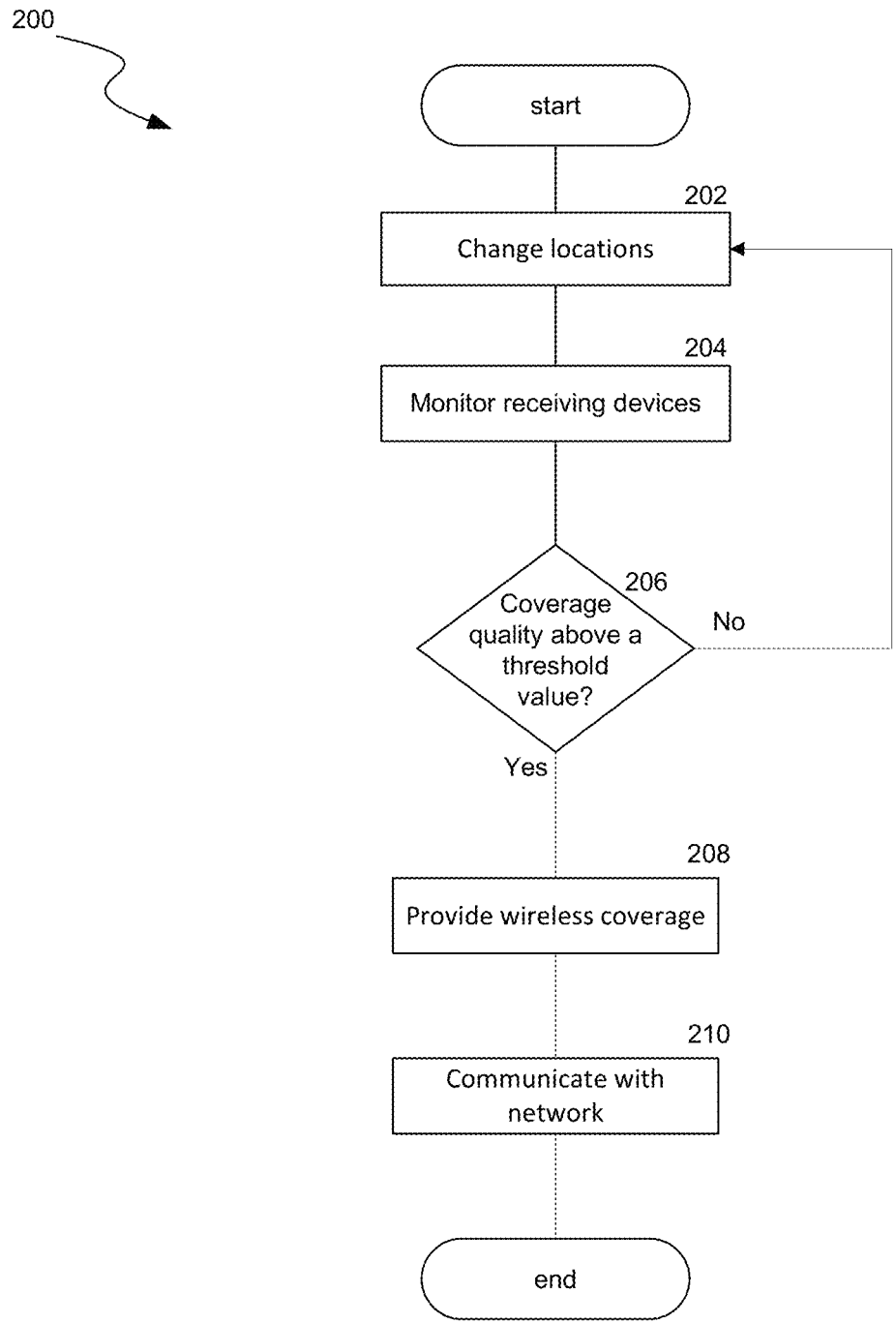
FIG. 2 is a flow diagram illustrating a process used in some implementations for providing autonomous wireless coverage.

FIG. 2 is a flow diagram illustrating a process 200 used in some implementations for providing autonomous wireless coverage. In an embodiment, process 100 is triggered by a mobile wireless tower powering on, a mobile wireless tower connecting to or communicating with a network, a mobile wireless tower changing locations, a user request for coverage, or network coverage dropping below a threshold value in an area.

At step 202, process 200 can change the location of the mobile wireless tower. For example, the mobile wireless tower can change locations to mitigate interference from terrain (e.g., trees, buildings, objects, etc.) near user devices. Input factors for mobile wireless tower relocation include movement of the devices needing coverage, identified coverage decreases at a location, shifting geography or flora/fauna (e.g., leaves on trees) in the coverage environment, detected interference from other wireless devices (e.g., out of band or shared-band scenarios, such as CBRS GAA/PAL usage, where other users can join the network, or interference from military radar etc.), changing weather conditions, changing number of devices using the coverage, users of the network having changes to the service level agreements (SLAs) (i.e., moving to higher/lower bandwidth needs), safety/emergency situations, security situation, (5G) network slicing parameter changes, maintenance events, manual requests from users/customers, payment changes by users, time of day (e.g., during rush hour), time of year, schedule-based needs (i.e. shift changes, hours/days of operation, etc.), backhaul or local outages, changes to backhaul connectivity (i.e., a satellite or fixed wireless access (FWA) has connectivity degradation which requires the mobile wireless tower to relocate to fix the signal).

Process 200 can determine whether, when, and how much to move the mobile wireless tower based on AI based network decisions or AI based coverage threshold values. In some implementations, process 200 can determine whether, when, and how much to move the mobile wireless tower based on user determined decisions or coverage threshold values. Process 200 can determine to relocate based on test measurements to determine if location changes increase or decrease network coverage. For example, the wireless tower performs testing during low usage periods or when coverage is not required.

Process 200 can determine the location from which to provide coverage based on data reported from other mobile or fixed sources. For example, other mobile wireless towers or wireless coverage sources can collect data regarding locations and coverage metrics at a site (e.g., stadium, venue, campus, etc.) and process 200 analyzes the collected data to determine the location. Process 200 can transit an area to make the determination about where the best location is to provide coverage to the wireless devices. For example, process 200 can collect measurements at various locations throughout an area and determine the location with the highest quality coverage. The mobile wireless tower can determine a location that provides coverage to the largest number of the wireless devices. In some cases, process 200 determines a location that provides coverage to wireless devices with the largest network bandwidth and lowest latency. Process 200 can analyze environment data (e.g., geographic/site plans, GPS information etc.) of an area to identify the location from which to provide coverage. In an example, the mobile wireless tower identifies a location (e.g., hill, top of parking garage, etc.) based on elevation of the location, such as a location that overlooks the area. In another example, the mobile wireless tower identifies the location based on the layout of the site and selects a location that provides coverage to the largest percentage of the site.

At step 204, process 200 monitors the network coverage quality provided to the wireless devices. The network coverage quality can change due to the wireless devices changing locations or objects interfering in the network coverage. For example, as the mobile wireless tower provides network coverage to a school, process 200 detects that the wireless devices have changed from a classroom location to a parking lot location. In some implementations, process 200 measures (e.g., periodically, or continually) where the highest demand for network coverage is located and relocates to provide coverage to that location. For example, the process 200 can detect an event (e.g., sporting event, concert, construction site, etc.) and move to a location to provide coverage to users at the event. In another example, a mobile workforce (e.g., mining or construction equipment) requires coverage at various locations throughout a site during operation. Process 200 can detect where the devices are and determine the optimal location for the mobile wireless tower to provide coverage to the devices at the site.

Process 200 can monitor for changes to the configuration of network equipment. For example, process 200 detects a wireless tower failing to provide coverage to a location and coordinates with another mobile wireless tower to provide coverage. In some implementations, process 200 coordinates with other autonomous mobile wireless towers and/or fixed coverage towers to provide coverage to a location. For example, mobile wireless towers coordinate to provide network coverage to users at an event by determining various positions around and throughout the event's location to provide coverage to users. The coordination can start as user defined coordination and became AI directed coordination when enough data is collected. The mobile wireless towers can communicate to each other and exchange data to improve coverage performance. For example, a number of mobile wireless towers can coordinate and operate as a group to provide network coverage to an area.

At step 206, process 200 determines whether the coverage quality provided to the users is above a threshold value. When process 200 determines the coverage quality is above the threshold value, at step 208, process 200 provides coverage to the devices. If the coverage quality is below a threshold value, process 200 can return to step 202 and identify another location to provide coverage with a higher network coverage quality.

At step 210, process 200 communicates with the network to provide measurement data and retrieve data regarding the performance of the mobile wireless tower. In some implementations, the mobile wireless tower communicates with the network to determine the location from which to provide coverage (e.g., using AI or ML retrieved from the network). Process 200 can coordinate between other mobile wireless towers or static towers to provide coverage to the devices. Each mobile wireless tower can have a backhaul capability (i.e. satellite, fixed wireless access, Wi-Fi, cellular, etc.) for the mobile wireless tower to send and retrieve data stored on the network.

Figure 4:
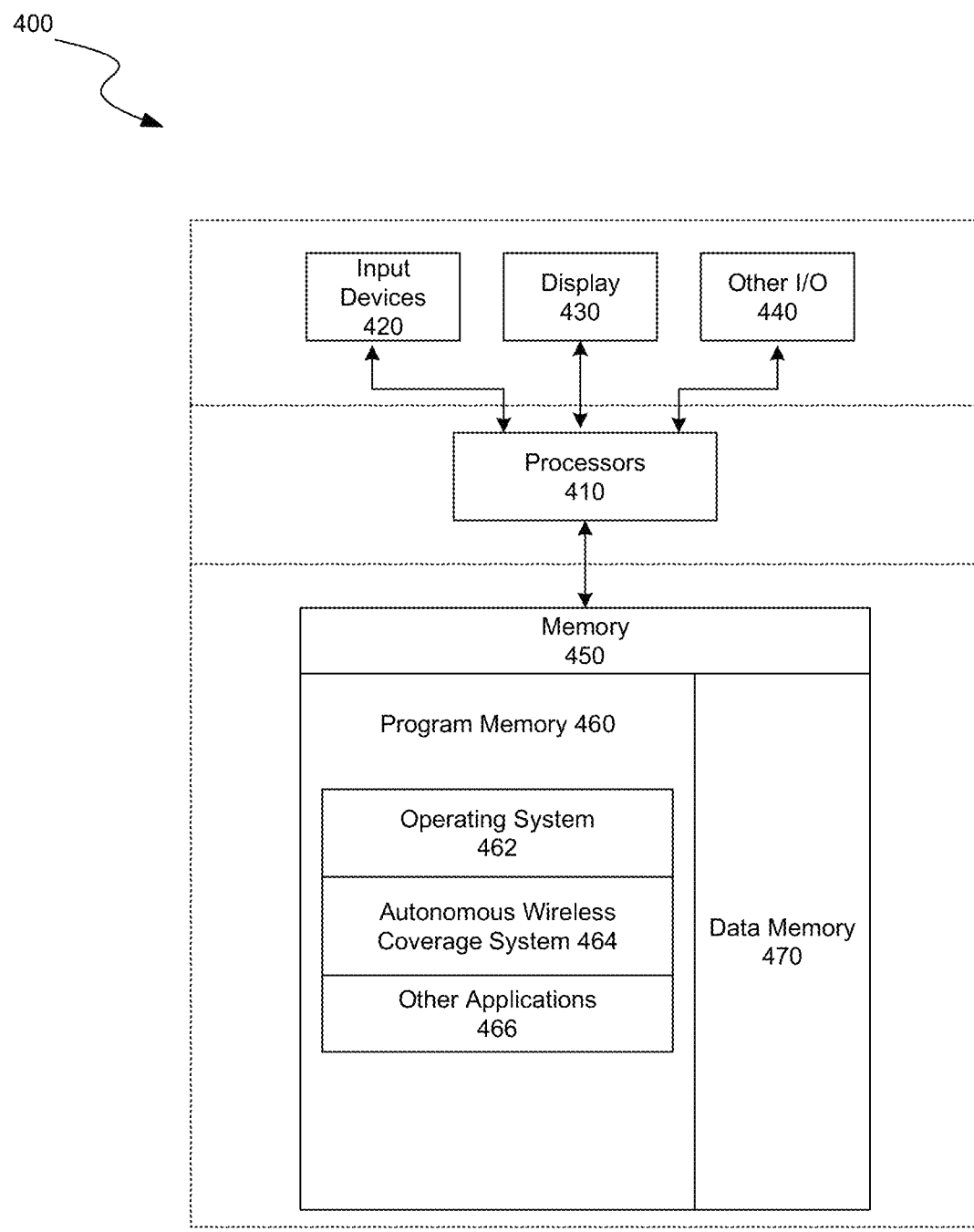
FIG. 4 is a block diagram illustrating an overview of devices on which some implementations can operate.

FIG. 4 is a block diagram illustrating an overview of devices on which some implementations of the disclosed technology can operate. The devices can comprise hardware components of a device 400 that manage entitlements within a real-time telemetry system. Device 400 can include one or more input devices 420 that provide input to the processor(s) 410 (e.g. CPU(s), GPU(s), HPU(s), etc.), notifying it of actions. The actions can be mediated by a hardware controller that interprets the signals received from the input device and communicates the information to the processors 410 using a communication protocol. Input devices 420 include, for example, a mouse, a keyboard, a touchscreen, an infrared sensor, a touchpad, a wearable input device, a camera- or image-based input device, a microphone, or other user input devices.

Processors 410 can be a single processing unit or multiple processing units in a device or distributed across multiple devices. Processors 410 can be coupled to other hardware devices, for example, with the use of a bus, such as a PCI bus or SCSI bus. The processors 410 can communicate with a hardware controller for devices, such as for a display 430. Display 430 can be used to display text and graphics. In some implementations, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 440 can also be coupled to the processor, such as a network card, video card, audio card, USB, firewire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The processors 410 can have access to a memory 450 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 450 can include program memory 860 that stores programs and software, such as an operating system 462, autonomous wireless coverage system 464, and other application programs 466. Memory 450 can also include data memory 470, LIDAR data, environment data, image data, signal data, backhaul data, device data, satellite data, machine learning data, artificial intelligence data, cellular data, signal quality data, detection data, terrain data, camera data, retrieval data, management data, notification data, configuration data, settings, user options or preferences, etc., which can be provided to the program memory 460 or any element of the device 400.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
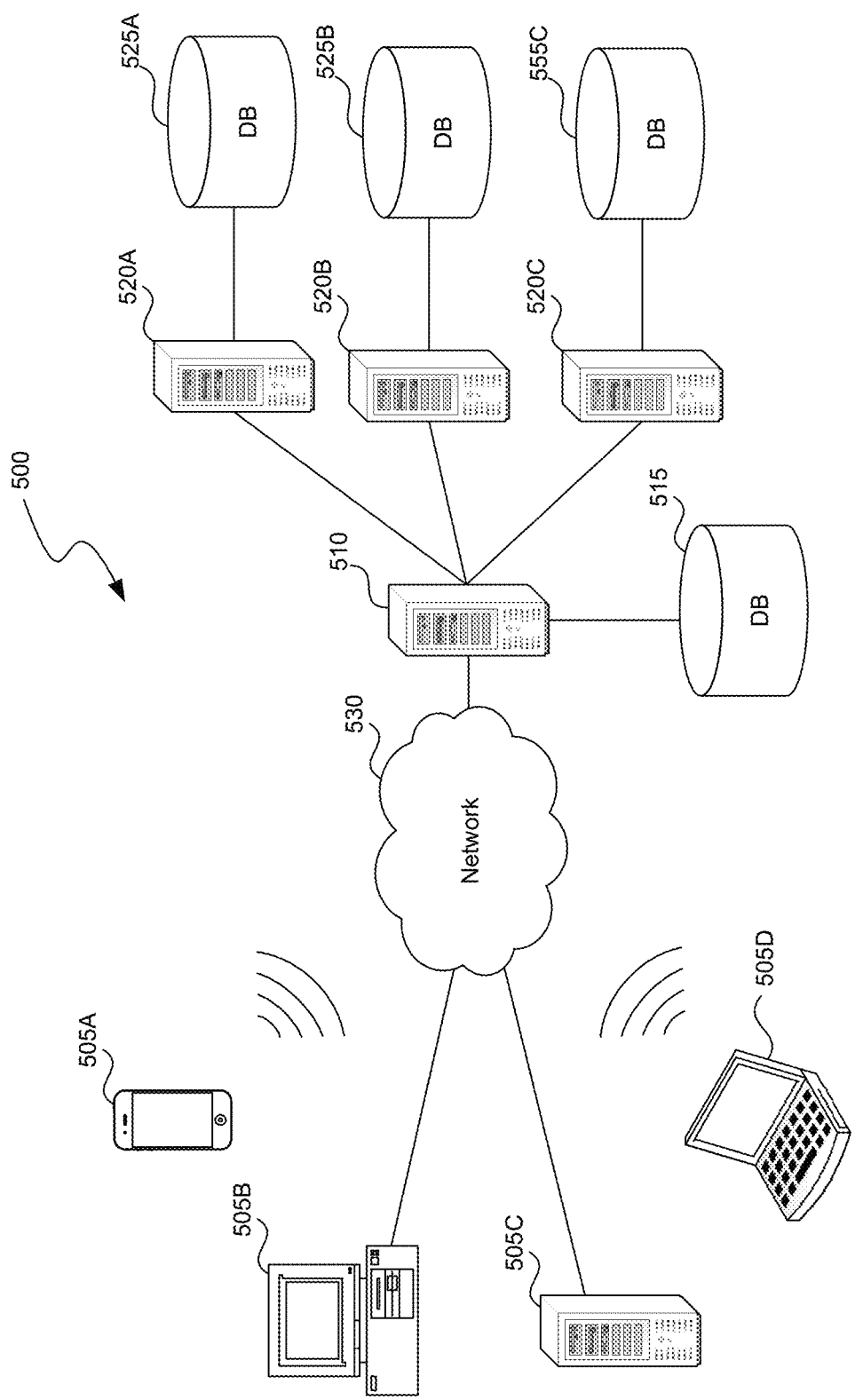
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-D, examples of which can include device 400. Client computing devices 505 can operate in a networked environment using logical connections through network 530 to one or more remote computers, such as a server computing device 510.

In some implementations, server 510 can be an edge server which receives client requests and coordinates fulfillment of those requests through other servers, such as servers 520A-C. Server computing devices 510 and 520 can comprise computing systems, such as device 400. Though each server computing device 510 and 520 is displayed logically as a single server, server computing devices can each be a distributed computing environment encompassing multiple computing devices located at the same or at geographically disparate physical locations. In some implementations, each server 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g. store) information such as implement data, LIDAR data, environment data, image data, signal data, backhaul data, device data, satellite data, machine learning data, artificial intelligence data, cellular data, signal quality data, detection data, terrain data, camera data, retrieval data, management data, notification data, and configuration data. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
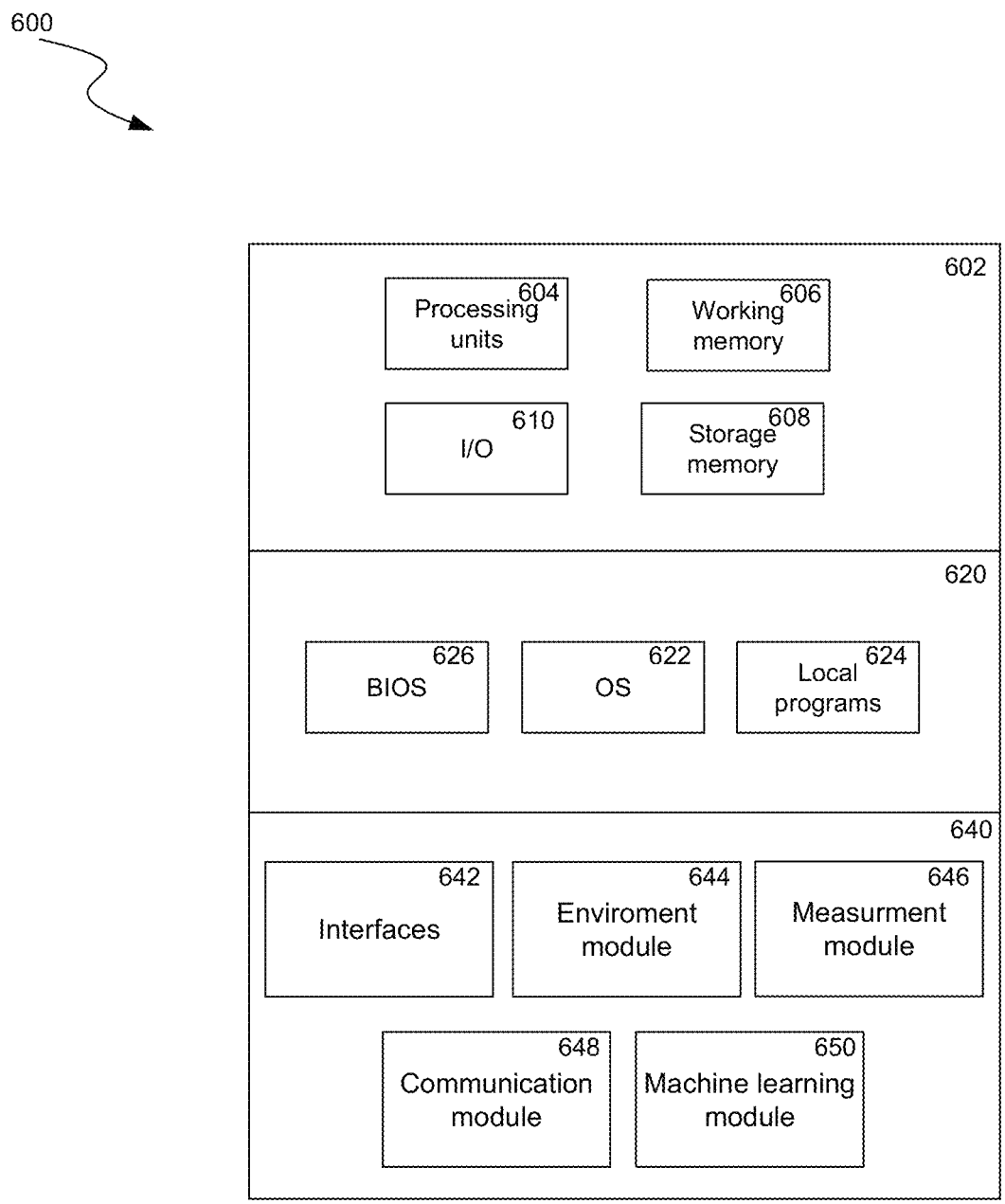
FIG. 6 is a block diagram illustrating components which in some implementations can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware including processing units 604 (e.g. CPUs, GPUs, APUs, etc.), working memory 606, storage memory 608 (local storage or as an interface to remote storage, such as storage 515 or 525), and input and output devices 610. In various implementations, storage memory 608 can be one or more of: local devices, interfaces to remote storage devices, or combinations thereof. For example, storage memory 608 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 515 or storage provided through another server 520). Components 600 can be implemented in a client computing device such as client computing devices 505 or on a server computing device, such as server computing device 510 or 520.

General software 620 can include various applications including an operating system 622, local programs 624, and a basic input output system (BIOS) 626. Specialized components 640 can be subcomponents of a general software application 620, such as local programs 624. Specialized components 640 can include environment module 644, measurement module 646, communication module 648, machine learning module 650, and components which can be used for providing user interfaces, transferring data, and controlling the specialized components, such as interfaces 642. In some implementations, components 600 can be in a computing system that is distributed across multiple computing devices or can be an interface to a server-based application executing one or more of specialized components 640. Although depicted as separate components, specialized components 640 may be logical or other nonphysical differentiations of functions and/or may be submodules or code-blocks of one or more applications.

In some embodiments, the environment module 644 is configured to collect environment data of an area using sensors (e.g., cameras, LIDAR, etc.) and determine a location to provide coverage based on the environment. The environment module 644 can generate a mapping of the environment with the devices in the area. The mapping can include locations of devices in need of coverage and locations from which the mobile wireless tower can provide coverage.

In some embodiments, the measurement module 646 is configured to measure the network coverage quality provided to the user devices. The network coverage quality can change due to the wireless devices changing locations or objects interfering in the network coverage. The measurement module 646 measures (e.g., periodically, or continually) where the highest demand for network coverage is located and generates a command to relocate the mobile wireless tower to provide coverage to that location. The measurement module 646 can detect where the devices are and determine the optimal location for the mobile wireless tower to provide coverage to the devices at the site.

In some embodiments, the communication module 648 is configured to communicate with the network to retrieve and send data (e.g., backhaul capability) regarding mobile wireless tower coverage. The communication module 648 can receive updates from the network. In some implementations, the communication module 648 can communicate with mobile wireless towers or static wireless towers to coordinate coverage to user devices.

In some embodiments, the machine learning module 650 is configured to analyze the input data (e.g., environment data and device location data) and determine the location to provide coverage to the devices. The machine learning module 650 may be configured to determine a location to provide coverage to devices based on at least one machine-learning algorithm trained on at least one dataset of network coverage location data. The at least one machine-learning algorithms (and models) may be stored locally at databases and/or externally at databases. Mobile wireless towers may be equipped to access these machine learning algorithms and intelligently determine coverage locations based on at least one machine-learning model that is trained on a dataset of coverage locations. As described herein, a machine-learning (ML) model may refer to a predictive or statistical utility or program that may be used to determine a probability distribution over one or more-character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process environment data and device coverage databases and other data stores to determine a location from which to provide coverage to devices.

Based on environment data and device coverage data databases and platforms and other user data stores, at least one ML model may be trained and subsequently deployed to automatically determine coverage providing locations for a mobile wireless tower to provide network coverage to devices. The trained ML model may be deployed to one or more devices. As a specific example, an instance of a trained ML model may be deployed to a server device and to a client device which communicate with a mobile wireless tower. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with item information, such as specific image or building information. In such examples, the ML model may be locally cached by the client device.

Those skilled in the art will appreciate that the components illustrated in FIGS. 4-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method comprising:
    collecting environment data of an environment with one or more sensors on a ground-based autonomous machine that provides wireless coverage;
    identifying, in the environment data, at least one object location of one or more terrain objects in the environment;
    detecting one or more devices in at least one device location in the environment;
    identifying, based on the at least one object location of the one or more terrain objects and the at least one device location, a first geolocation for the ground-based autonomous machine to provide the wireless coverage to the one or more devices,
        wherein the first geolocation provides a line of sight between the one or more devices and the ground-based autonomous machine; and
    navigating the ground-based autonomous machine to the first geolocation to provide the wireless coverage to the one or more devices.

2. The method of claim 1, further comprising:
    determining a wireless coverage quality provided from the first geolocation is below a threshold value; and
    in response to the wireless coverage quality being below the threshold value, identifying a second geolocation to provide the wireless coverage to the one or more devices.

3. The method of claim 1, further comprising:
    detecting the one or more devices changed locations within the environment; and
    identifying, based on the one or more devices changing locations, a second geolocation.

4. The method of claim 1, further comprising:
    detecting the one or more devices requesting the wireless coverage; and
    identifying locations of the one or more devices in the environment.

5. The method of claim 1, further comprising:
    converting the environment data into an input for a machine learning model; and
    applying the input to the machine learning model and in response identifying the first geolocation based on output from the machine learning model.

6. The method of claim 1, wherein the ground-based autonomous machine includes a wireless backhaul radio, cellular antennas, a telescoping tower, cameras, and a power source.

7. The method of claim 1, wherein the environment data includes terrain and device locations.

8. A computing system comprising:
 at least one processor; and
 at least one memory storing instructions that, when executed by the at least one processor, cause the computing system to perform a process comprising:
  collecting environment data of an environment with one or more sensors on a ground-based autonomous machine that provides wireless coverage;
  identifying, in the environment data, at least one object location of one or more terrain objects in the environment;
  detecting one or more devices in at least one device location in the environment;
  identifying, based on the at least one object location of the one or more terrain objects and the at least one device location, a first geolocation for the ground-based autonomous machine to provide the wireless coverage to the one or more devices,
   wherein the first geolocation provides a line of sight between the one or more devices and the ground-based autonomous machine; and
  navigating the ground-based autonomous machine to the first geolocation to provide the wireless coverage to the one or more devices.

9. The computing system of claim 8, wherein the process further comprises:
 determining a wireless coverage quality provided from the first geolocation is below a threshold value; and
 in response to the wireless coverage quality being below the threshold value, identifying a second geolocation to provide the wireless coverage to the one or more devices.

10. The computing system of claim 8, wherein the process further comprises:
 detecting the one or more devices changed locations within the environment; and
 identifying, based on the one or more devices changing locations, a second geolocation.

11. The computing system of claim 8, wherein the process further comprises:
 detecting the one or more devices requesting the wireless coverage; and
 identifying locations of the one or more devices in the environment.

12. The computing system of claim 8, wherein the process further comprises:
 converting the environment data into an input for a machine learning model; and
 applying the input to the machine learning model and in response identifying the first geolocation based on output from the machine learning model.

13. The computing system of claim 8, wherein the ground-based autonomous machine includes a wireless backhaul radio, cellular antennas, a telescoping tower, cameras, and a power source.

14. The computing system of claim 13, wherein the environment data includes terrain and device locations.

15. An apparatus comprising:
 a memory;
 one or more processors electronically coupled to the memory and configured for:
  collecting environment data of an environment with one or more sensors on a ground-based autonomous machine that provides wireless coverage;
  identifying, in the environment data, at least one object location of one or more terrain objects in the environment;
  detecting one or more devices in at least one device location in the environment;
  identifying, based on the at least one object location of the one or more terrain objects and the at least one device location, a first geolocation for the ground-based autonomous machine to provide the wireless coverage to the one or more devices,
   wherein the first geolocation provides a line of sight between the one or more devices and the ground-based autonomous machine; and
  navigating the ground-based autonomous machine to the first geolocation to provide the wireless coverage to the one or more devices.

16. The apparatus of claim 15, wherein the one or more processors are further configured for:
 determining a wireless coverage quality provided from the first geolocation is below a threshold value; and
 in response to the wireless coverage quality being below the threshold value, identifying a second geolocation to provide the wireless coverage to the one or more devices.

17. The apparatus of claim 15, wherein the one or more processors are further configured for:
 detecting the one or more devices changed locations within the environment; and
 identifying, based on the one or more devices changing locations, a second geolocation.

18. The apparatus of claim 15, wherein the one or more processors are further configured for:
 detecting the one or more devices requesting the wireless coverage; and
 identifying locations of the one or more devices in the environment.

19. The apparatus of claim 15, wherein the one or more processors are further configured for:
 converting the environment data into an input for a machine learning model; and
 applying the input to the machine learning model and in response identifying the first geolocation based on output from the machine learning model.

20. The apparatus of claim 15,
 wherein the ground-based autonomous machine includes a wireless backhaul radio, cellular antennas, a telescoping tower, cameras, and a power source, and
 wherein the environment data includes terrain and device locations.

* * * * *